(12) United States Patent
Vandaele

(10) Patent No.: US 12,029,169 B2
(45) Date of Patent: Jul. 9, 2024

(54) BALING MACHINE INCLUDING A PRE-BALING CHAMBER ROTATIVE PACKER/STUFFER

(71) Applicant: CNH Industrial America LLC, New Holland, PA (US)

(72) Inventor: Thomas Vandaele, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 946 days.

(21) Appl. No.: 17/065,486

(22) Filed: Oct. 7, 2020

(65) Prior Publication Data
US 2021/0100169 A1     Apr. 8, 2021

(30) Foreign Application Priority Data

Oct. 7, 2019   (EP) ..................................... 19201773

(51) Int. Cl.
*A01F 15/10*      (2006.01)
*A01F 15/02*      (2006.01)
(Continued)

(52) U.S. Cl.
CPC ............ *A01F 15/101* (2013.01); *A01F 15/02* (2013.01); *A01F 15/042* (2013.01); *A01F 15/0825* (2013.01); *A01F 2015/102* (2013.01)

(58) Field of Classification Search
CPC ...... A01F 15/101; A01F 15/02; A01F 15/042; A01F 15/0825; A01F 2015/102; A01F 15/10
See application file for complete search history.

(56) References Cited

U.S. PATENT DOCUMENTS 4,157,643 A * 6/1979 White ................... A01F 15/101
                                                    100/189
6,474,228 B1 * 11/2002 Leupe ..................... A01F 15/08
                                                    100/45
(Continued)

FOREIGN PATENT DOCUMENTS

DE         3811649 C1    6/1989
EP         3001894 A1    4/2016
EP         3158857 A1    4/2017

OTHER PUBLICATIONS

Extended European Search Report for EP Patent Application No. 19201773.9 dated Mar. 26, 2020 (9 pages).

*Primary Examiner* — Aniss Chad
*Assistant Examiner* — Jennifer M Anda
(74) *Attorney, Agent, or Firm* — Peter K. Zacharias; Rebecca L. Henkel; Rickard K. DeMille

(57) ABSTRACT

A baling machine includes a pre-baling chamber and a rotative packer/stuffer including at least one retractable and extendable tine including at least one stuffer tine supported on at least a first reciprocable support. The at least one stuffer tine sequentially penetrates, moves in, and retracts from the pre-baling chamber when activated by at least one stuffer activator. The packer-stuffer includes at last one sensor that senses a vector or pseudovector quantity acting on at least one rotative component. The baling machine also includes at least one processor for estimating from the sensed quantity the amount of plant matter in the pre-baling chamber or a related variable, comparing this to a threshold corresponding to desired filling of the pre-baling chamber, and causing the stuffer activator to initiate stuffing when the estimated plant matter or related variable attains or exceeds the threshold.

14 Claims, 8 Drawing Sheets

(51) Int. Cl.
*A01F 15/04* (2006.01)
*A01F 15/08* (2006.01)

(56) References Cited

U.S. PATENT DOCUMENTS

| | | | |
|---|---|---|---|
| 2006/0016166 A1* | 1/2006 | Dubois | A01F 15/0825 |
| | | | 56/341 |
| 2012/0247348 A1 | 10/2012 | Herron | |
| 2013/0167739 A1 | 7/2013 | Herron | |
| 2014/0318391 A1* | 10/2014 | Verhaeghe | A01F 15/101 |
| | | | 100/138 |
| 2015/0305241 A1* | 10/2015 | Waechter | A01D 69/00 |
| | | | 56/10.2 R |
| 2017/0105352 A1* | 4/2017 | Rosseel | A01F 15/0841 |
| 2017/0290273 A1* | 10/2017 | Devroe | A01F 15/101 |

* cited by examiner

BALING MACHINE INCLUDING A PRE-BALING CHAMBER ROTATIVE PACKER/STUFFER

FIELD OF THE INVENTION

The disclosure hereof relates to a baling machine including a pre-baling chamber rotative packer/stuffer. The disclosure also relates to such a baling machine in combination with a tractor that tows the baling machine.

BACKGROUND OF THE INVENTION

Baling machines as referred to herein are wheeled machines that are well known in agriculture. Various types of baling machines exist. Typically they bale plant parts, for example straw and forage (such as but not limited to hay), following agricultural operations such as harvesting of grains (in the case of straw production) and mowing or cutting (in the case of forage production).

Plant parts requiring baling normally are formed into swaths or windrows (i.e. elongate lines in which large numbers of usually individually small plant parts are heaped towards the transverse center of each line) in fields following agricultural operations. The swaths or windrows extend as a series of parallel lines along the fields. The swaths or windrows may exist in their as-created forms or they may undergo intermediate operations such as raking or tedding. Techniques of the creation and subsequent treatment of swaths/windrows requiring baling are well known and do not require describing in detail herein.

The terms "swath" and "windrow" are for convenience used interchangeably herein. In practice there are differences between swaths and windrows but from the standpoint of operation of most baling machine types they can be treated as essentially the same thing.

It should also be mentioned that the terms "baler" and "baling machine" are intended herein to mean the same thing and also are used interchangeably.

Baling machines generally are useable to bale a wide variety of forms of plant matter, as outlined above. Typically they are caused to straddle and travel along the swaths, ingesting the plant parts as they move. Internal components of the baling machine compress and compact the plant parts and cause them to become intermingled as bales that conveniently permit the handling, storage and transportation of useful amounts of plant matter at a time.

Some large baling machines are self-propelled and therefore include an on-board engine, transmission, drive train and operator's cab. The majority of baling machines in Europe however are not self-propelled and instead are free-wheeling. Such baling machines in use are towed behind agricultural tractors that provide motive power to cause movement of the baling machines; and rotative power, via the power take-offs (PTOs) of the tractors, for causing operation of the internal parts of the baling machines.

SUMMARY OF THE INVENTION

In an embodiment described herein a baling machine includes a pre-baling chamber, one or more retractable and extendable tines including at least one stuffer tine that is supported on at least a first support and that is capable of sequentially penetrating, moving in and retracting from the pre-baling chamber; the baling machine including one or more stuffer activators for causing the at least one stuffer tine in sequence to extend into, move in and retract from the pre-baling chamber; the baling machine including one or more vector or pseudovector quantity sensors that sense a vector or pseudovector quantity acting on one or more rotative and/or reciprocable components of or connected to the baling machine; and the baling machine including or being operatively connected to one or more processors for estimating from the sensed vector or pseudovector quantity the amount of plant matter in the pre-baling chamber or a variable related thereto and causing the stuffer activator to effect extension of the stuffer tine into the pre-baling chamber when the estimated amount of plant matter or the related variable attains or exceeds a threshold corresponding to desired filling of the pre-baling chamber.

Sensing of the vector or pseudovector quantity may within the scope of the disclosure take place in any of a variety of locations. These may be chosen such that the problem of plugging of the pre-baling chamber is eliminated. Moreover the use of sensors, especially sensors that generate electrical output signals, means that the stuffer cycle may be initiated more accurately than in the prior art.

Typically but not necessarily the stuffer tine activator causes the one or more stuffer tine to penetrate, move in and retract from the pre-baling chamber in accordance with a non-circular locus.

Preferably the baling machine includes at least one extendable and retractable packer tine that is reciprocably supported relative to the first support such that the packer tine is capable of sequentially penetrating, moving in and retracting from the pre-baling chamber. Such an arrangement is known per se in baler engineering. Embodiments of the invention are highly suitable for use with such a design.

Alternatively the baling machine may include at least one baling machine according to claim 1, further comprising at least one extendable and retractable packer tine that is reciprocally supported relative to at least one further reciprocable support that is rotatable about a rotor axis adjacent the pre-baling chamber to cause rotation of the at least one packer tine about the said rotor axis such that the at least one packer tine is capable of penetrating, moving in and retracting from the pre-baling chamber.

In some embodiments the first or a further support is common to, and therefore supports, the at least one stuffer tine and at least one packer tine when the latter is present.

In some embodiments the first and further supports are elongate; a plurality of stuffer tines is equidistantly spaced apart along the first support and a plurality of packer tines is equidistantly spaced apart along the further support.

As disclosed but not specifically claimed herein, optionally the at least one stuffer tine is rotatable relative to at least one support that supports it and the at least one packer tine is rotatable relative to at least one support that supports it.

Alternatively the at least one stuffer tine may be fixed relative to at least one support that supports it and the at least one packer tine may be fixed relative to the at least one support that supports it.

In embodiments disclosed herein the at least one stuffer tine is capable of sequentially penetrating, moving in and retracting from the pre-baling chamber in accordance with a packing locus that differs from the stuffing locus, the baling machine including at least one packer locus drive that causes the at least one stuffer tine to move in a manner following the packing locus when not following the stuffing locus. Thus it is possible to provide a single type of tine (that may, and typically would, be provided in plural numbers) that is a dual-purpose packer and stuffer tine that operates in accordance with the double strike principle explained herein.

Further optionally the stuffer tine may be supported by a stuffer tine reciprocal linkage that includes at least one longitudinally reciprocal linkage member movement of which causes the stuffer tine reciprocally to extend into, move in and retract from the interior of the pre-baling chamber. Preferably the stuffer tine reciprocal linkage is connected to the stuffer tine, although it is possible for the linkage to influence movement of the stuffer tine otherwise than via a physical connection.

Such arrangements, which are known per se in rotative packer/stuffer machinery, permit a plurality of stuffer tines (or groups of stuffer tines, when more than one stuffer tine is mounted on each stuffer tine shaft) to be caused to reciprocate into and out of the pre-baling chamber.

In a similar manner one or more packet tines optionally may be operatively connected to a reciprocal linkage mechanism that effects the packer tine motion.

Embodiments of the invention thus are of utility in a range of baler types in which various stuffer and packer tine mounting arrangements may be included. Other means, than those described, of mounting the stuffer tine also are possible and are within the scope of the disclosure hereof. The packer tines may be mounted at equiangular intervals over part or all of a circumference defined by at least one reciprocable support such as but not limited to at least one rotor, thereby giving rise to an efficient mechanism in which the packing operation includes rapidly repeating packer tine strokes.

Optionally the at least one vector or pseudovector quantity sensor includes or is connected to a bridge circuit. The baling machine preferably includes at least one vector or pseudovector quantity sensor that detects one or more vector or pseudovector quantity developed at one or more packer tine when one or more packer tine subsists inside the pre-baling chamber. Sensing at plural packer tines, when practiced, advantageously provides a large number of vector or pseudovector data sets per revolution of the rotor, thereby ensuring good accuracy of the measurements made using apparatus according to the disclosure.

Optionally the baling machine includes at least one vector or pseudovector quantity sensor positioned at one or more stuffer tines and that detects one or more vector or pseudovector quantities developed at one or more stuffer tines when one or more stuffer tines subsist inside the pre-baling chamber, the one or more processors comparing the at least one vector or pseudovector quantity detected at the one or more stuffer tines to a limit threshold value and cause an alarm and/or interrupt operation of the one or more stuffer tines when the one or more vector or pseudovector quantity attains or exceeds the limit threshold value.

An advantage of one or more sensors sensing the torque or another vector or pseudovector quantity acting on a plurality of the packer tines when they extend into or otherwise lie inside the pre-baling chamber during rotation of the rotor is that the sensing of e.g. force, torque or displacement may take place across the width of the pre-baling chamber, by reason of plural packer tines being positioned at intervals along the lengths of their mounting shafts. The provision of at least two sensors respectively associated with packer tines at opposite ends of a said shaft means that respective force, torque or displacement measurements may be made corresponding to the left- and right-hand sides of the pre-baling chamber (with force measurements being particularly preferred in this regard).

Such measurements permit an assessment of whether the pre-baling chamber is being evenly loaded across its transverse width. This is a useful assessment because any significant discrepancies between the filling of different parts of the pre-baling chamber can give rise to bale density inconsistencies when the plant matter is transferred to the bale-forming chamber and undergoes compaction.

A loading evenness assessment as described may be used to generate command signals, as described below, for correcting any uneven filling of the pre-baling chamber.

Thus preferably the baling machine includes at least one respective said sensor sensing a vector or pseudovector quantity at left- and right-hand sides of the pre-baling chamber.

The left- and right-hand sides of the pre-baling chamber may be defined with reference to a central fore-and-aft axis of the baling machine. A typical baling machine is elongate along this axis and as mentioned includes a forwardmost end. The left-hand side may be defined as being on the left of the fore-and-aft axis when viewed from the rear of the baling machine; and the right-hand side may be construed accordingly. However other conventions for defining the left- and right-hand sides of the pre-baling chamber may also be used, and are within the scope of the disclosure hereof.

When the baling machine is able to sense left- and right-hand side torques as mentioned, preferably the one or more processors determines an optimal direction of motion and/or speed of the baler, derived from the respective said sensors, that optimizes filling of the pre-baling chamber; and generates a directional guidance and/or speed signal indicative of the instantaneously optimal direction and/or speed. In addition it optionally is possible, within the scope of the invention, to generate commands that adjust the feedrate of plant matter into the baling machine. In like manner to the direction and speed commands mentioned, the feedrate command(s) may be such as to optimize filling of the pre-baling chamber. The feedrate command(s) may be such as to alter e.g. the rate at which the pick-up 14 causes the ingestion of plant matter.

As mentioned this is a significant advantage of the invention over the prior art, in which no provision exists for optimizing filling of a pre-baling chamber.

The invention additionally and non-limitingly extends to such a baling machine when towed behind an agricultural tractor, wherein the one or more processors is operatively connected to the tractor and transmits the directional guidance and/or speed and/or feedrate signal for use in the tractor.

Such a guidance signal may be for example a command for an actuator that effects automated steering of the tractor; or it may result in generation or modification of a display such as but not limited to a satellite navigation screen or a mimic panel or screen on which a recommended travel path of the tractor may be displayed together with e.g. mapping or terrain graphical information; or it may give rise to e.g. a visible or audible alert in the operator's cab of the tractor. Such an alert may be configured e.g. to sound or be visible or change color when the tractor fails to follow an optimal baling machine filling path relative to a swath or it may sound or otherwise be distinctive when the tractor is following such a path.

Similarly the one or more processors may generate speed control or guidance signals that may effect operation of a speed control sub-system of the towing tractor or may give rise to e.g. the displaying via a display of a target speed or speed range that an operator must try to match. Audible and/or visible (or other sensory) alerts of speed aspects also are possible. Thus for example alarms may sound or warning displays may activate when the speed of the towing tractor departs from an optimum speed, from the standpoint of baling machine filling, or an optimum speed range.

Numerous other ways of using the optimal path guidance and speed command signal options also are possible and the invention is not limited to the foregoing examples.

A feedrate signal as mentioned herein is more likely than a speed or directional guidance signal to have an automatic effect on the parts of the baling machine that influence the rate of inflow of plant matter. However it is at least theoretically possible, and within the scope of the disclosure, for the feedrate signal to result in some form of alert or target indicator for a driver of e.g. a tractor towing a baling machine (or for the driver of a self-propelled baling machine).

Thus in summary the invention also is considered non-limitingly to reside in a combination of a tractor towing a baling machine as defined herein wherein the one or more processor is operatively connected to the tractor and transmits the directional and/or speed guidance signal and/or a feedrate signal for use in the tractor as one or more of a directional command for commanding operation of an automated steering mechanism of the tractor to steer the tractor in a manner optimizing filling of the pre-baling chamber; and/or a speed setting command for commanding operation of a speed control mechanism in a manner optimizing filling of the pre-baling chamber and/or a warning signal for causing an alert to a tractor operator controlling the steering and/or the speed of the tractor; and/or a feedrate command for commanding operation of a feedrate control mechanism in a manner optimizing filling of the pre-baling chamber; and/or a warning signal for causing an alert to a tractor operator controlling the feedrate.

In such arrangements preferably at least one said processor is mounted on or is part of the baler; or is mounted on or is part of the tractor. The processor may be constituted by multiple components that may be distributed between the tractor (or other towing vehicle) and the baling machine.

Preferably the vector or pseudovector quantity sensed by the one or more vector or pseudovector quantity sensors includes one or more of a torque or a force acting via at least one said packer tine when the said packer tine extends into the pre-baling chamber, or a displacement of a said packer tine when it so extends; a torque or a force acting on or via the stuffer tine when the stuffer tine extends into the pre-bailing chamber, or a displacement of the stuffer tine when it so extends; or a torque or a force acting in a shaft connected to the power-take-off of a vehicle to which the baling machine is connected; or a displacement of a shaft connected to the power-take-off of a vehicle to which the baling machine is connected.

Combinations of different vector quantity types, combinations of different pseudovector quantity types, and combinations of vector and pseudovector quantity types are possible within the scope of the disclosure. As explained further herein, non-limiting examples of vector quantities that may usefully be sensed in a baling machine include displacements and forces; and a non-limiting example of a pseudovector quantity is a torque.

Thus the baling machine of the invention may be configured in a variety of ways that advantageously rely on the sensing of vector or pseudovector quantities that are detectable as a result of operation of internal parts of the machine. This confers good accuracy on the (preferably electrical) signals generated using sensors in the baling machine.

As used herein the term "sensor" includes within its scope any of a range of device types that are capable of generating signals indicative of force or torque. Especially preferred are load cells, torque sensors and strain gauges.

The signals output by sensors as referred to herein may take a range of physical forms including but not limited to acoustic, optical, magnetic, pressure, force or electrical signals, with electrical signals being preferred. Such signals may be transmitted, processed, transformed, filtered, amplified, analyzed, saved and/or otherwise modified or treated in accordance with the invention.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE INVENTION

The disclosure relates to a form of baling machine that is commonly referred to as a "rectangular baler".

As the name implies, a rectangular baler produces so-called rectangular bales. These are self-supporting, elongate cuboids of baled plant matter. The integrity of the bales is maintained through the use of lengths of twine that most designs of rectangular baling machine are capable of applying around the bales and knotting before the bales are ejected from a chute typically at the rear of the baling machine.

Rectangular bales variously are designated as "standard" or "small"; "medium" or "midi"; and "big" or "large", with corresponding nomenclature of the baling machines used to produce them reflecting the bale sizes produced. Small bales typically weigh a few tens of kilograms and the largest rectangular bales several hundred kilograms. The precise weight of a bale depends on multiple factors including the type of plant baled, the moisture content of the plant matter and the bale density.

Figure 1:
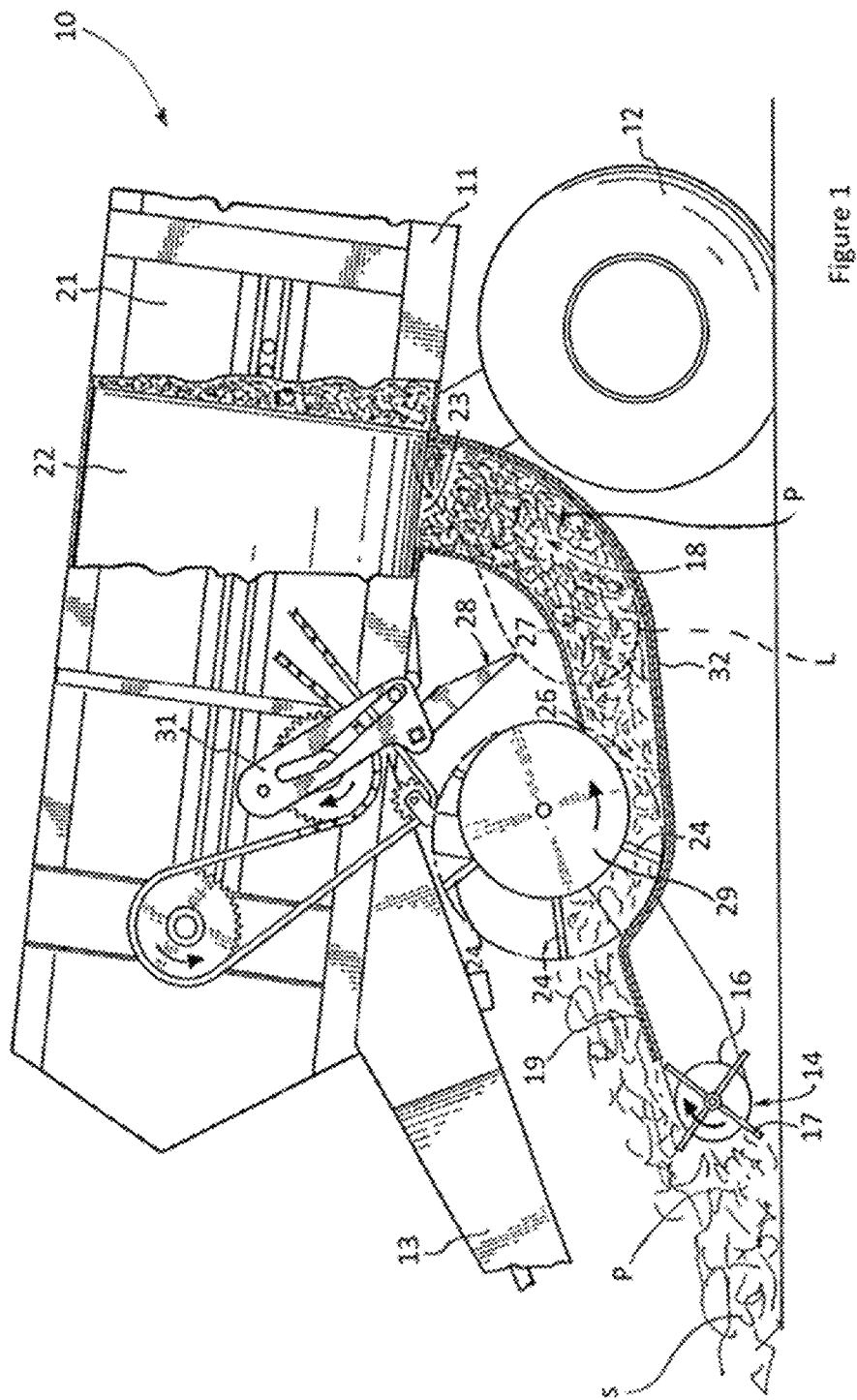
FIG. 1 is a partially sectioned, side elevational view of a typical baling machine in which the principles and embodiments of the invention may be included.

FIG. 1 shows in transverse, partly-sectioned view an exemplary, non-limiting baling machine 10. Such a baling machine is suitable for incorporation of the invention, but the disclosure hereof is not limited to inclusion of the concepts and features described herein in the baling machine illustrated.

The machine 10 of FIG. 1 is of a type that is towed behind a tractor. To this end the baling machine 10 includes a machine frame 11 having supported on its underside a pair of ground-engaging rear wheels of which the left-hand wheel 12 is visible. More than the described pair of wheels may be provided. Thus the baling machine may have e.g. front wheels or plural rear wheels on each lateral side of the frame 11.

A towing frame 13 extends forwardly of the machine 10 for hitching to the towing hitch of a tractor or another vehicle that is capable of towing the baling machine over fields containing plant matter to be baled.

Whether the baling machine is self-propelled or towed, the forwardmost operative part of a rectangular baler typically is or includes a pick-up 14. This is constituted primarily by an elongate structure extending from one side of the front of the baling machine to the other close to the ground over which the baling machine travels. The pick-up may include a rotatable cylinder 16 having pick-up tines 17 mounted on it at intervals about the periphery of the cylinder 16 and at intervals along its (transverse, relative to the fore-and-aft dimension of the baling machine 10) length. The cylinder 16 is powered to rotate in use as illustrated by the arrow in FIG. 1 and propel, by way of the pick-up tines 17, the plant matter requiring baling rearwardly into the baling machine 10.

In FIG. 1 four straight pick-up tines 17 are illustrated, but the disclosure is not limited to this arrangement. Other numbers and shapes of pick-up tines are possible within the scope of the invention.

Other forms of pick-up also are known and include screw conveyors or augers, or belt-type conveyors. The latter usually are provided in combination with rotating pick-up tines that transfer plant matter from the windrows onto a conveyor belt.

In use the baling machine 10 attached to a tractor travels forwardly in a field with its pick-up 14 straddling a windrow or swath S. The action of the pick-up causes ingestion of the plant matter P of the windrow or swath S into the baling machine 10.

The plant matter P passes initially into a rectangular cross-section chamber 18 often referred to as the pre-baling chamber of the baling machine. The forward end of the pre-baling chamber 18 is formed as an inlet 19 at a relatively low level in the baling machine, slightly above the level of the pick-up arrangement 14 that raises the plant matter P from ground level up to the inlet 19.

The pre-baling chamber 18 extends upwardly and rearwardly, typically following a curved shape, to the underside of a cuboidal bale-forming chamber 21. The bale-forming chamber 21 extends along a major part of the length of the upper part of the baling machine 10.

A large bale-forming piston or plunger 22 is capable of powered, reciprocal fore-and-aft movement inside the bale-forming chamber 21 along its length. The piston 22 is caused to move by a reciprocating-motion linkage that in turn in most baling machines is powered via a rotating shaft that is driven to rotate by the power take-off of the towing tractor. The plunger 22 occupies the cross-section of the bale-forming chamber 21 and is slideable along its length in a manner familiar to those of skill in the baler design art.

An entrance 23 in the bottom of the bale-forming chamber connects to the pre-baling chamber. The entrance is closed by the bale-forming piston or plunger 22 when the latter is at the right-hand end of the bale-forming chamber 21 as shown in FIG. 1. The entrance 23 is opened when the bale-forming piston reciprocates to the left in FIG. 1, towards the forward end of the baling machine 10, in order to permit the stuffing of a "slice" or charge of plant matter P from the pre-baling chamber 18 into the bale-forming chamber 21 for baling. In some balers an openable and closable mechanism is additionally provided for selectively closing off the entrance 23.

An arrangement of packer tines 24 forming part of a rotative packer/stuffer sub-system is capable of reciprocal motion in a manner repeatedly causing the packer tines 24 to move upwardly in the pre-baling chamber 18 in order to pack the plant matter P upwardly in the pre-baling chamber against e.g. a straw hook 107 (FIG. 8) that temporarily may be positioned adjacent the piston or plunger 22 that at such a time closes the entrance 23.

When sufficient plant matter P has been so packed the straw hook 107 is moved to open the entrance 23 and a number of stuffer tines 28 caused to enter into the pre-baling chamber 18 via a transversely extending series of slot-like openings 26 formed in an upper wall 27 of the pre-baling chamber 18 opposite a lower wall 32 in accordance with a reciprocal locus L. This results in a charge of plant matter P being forced upwardly via the entrance 23 into the bale-forming chamber 21 in the path of the piston 22. The bale-forming piston 22 then moves forcibly rearwardly (i.e. to the right in FIG. 1) in the bale-forming chamber 21 to cause the plant matter P to be compressed at the rear of the bale-forming chamber 21, against a previously formed bale, as part of a bale-forming operation.

The stuffing action may take place e.g. on the basis of a 1:1 relationship of the stuffer tine movement with that of the plunger; or another movement ratio such as the stuffer tines only operating in respect of every alternate plunger reciprocation. The precise movement relationship may depend on settings of the baling machine or may be fixed as a result of the design of the baling machine 10.

Repetition of the foregoing steps a number of times results in the forming of a complete bale at the rear of the bale-forming chamber. When the bale is complete twine is applied as mentioned, in a manner that is timed in relation to the movement of the plunger 22. The bale thereafter is ejected via a rearwardly facing chute of the baling machine 10 typically as a result of the action of the bale-forming piston 22 creating the next bale in succession inside the bale-forming chamber.

The packer tines 24 typically may be mounted either on longitudinally reciprocating arms such that they may be caused periodically to enter the pre-baling chamber as part of a curved locus defining a closed figure and move the plant matter towards the baling chamber door; or as illustrated on a shaft extending horizontally between rotatable rotor discs (of which one, 29, is visible in FIG. 1) located above opposite lateral sides of the pre-baling chamber 18 whereby an open cylindrical framework is defined. In the latter case the shafts rotate with the rotor discs 29 in a circular motion and the packer tines are able to extend and retract relative to the shafts in order to give rise to a desired, non-circular locus of the packer tines 24. The extension and retraction actions may result from "rocking" of the shafts while they rotate about the horizontal center axis of the rotor discs. Other means of causing extension and retraction of the packer tines 24 may be employed. Non-limiting examples of retractable and extensible mounting of the packer tines 24 are described herein.

Movement of the packer tines 24 is timed so they extend when they are adjacent the openings 26 via which they protrude into the pre-baling chamber 18. As a result rotation of the rotor discs 29 causes the packer tines 24 to move in this chamber 18 and cause movement of the plant matter P along it towards the bale-forming chamber doorway 23. The packer tines 24 retract under the influence of spring mechanisms when it is required by the constraints of the bale-forming process to move them away from the pre-baling chamber 18, with the result that the overall space required for the packer arrangement is less than if the packer tines 24 were limited to describing a circular locus.

It is known in another design of packer/stuffer assembly not shown in the drawings to arrange the mounting of the packer tines 24 so that the extent to which they pack plant matter P along the pre-baling chamber 18 reduces as the latter fills during the packing operation. Thus the first stroke of the packer tines 24 following feeding of a charge of plant matter P into the bale-forming chamber 21 may extend a certain distance along the pre-baling chamber. The next stroke may extend less far along the pre-baling chamber 18 thereby taking account of the plant matter P previously packed in the pre-baling chamber 18, and so on. The loci of the packer tines 24 in this process are successively adjusted such that they exit the pre-baling chamber via the openings 26 at progressively shorter distances along the pre-baling chamber 18.

The stuffer tines 28 may be mounted on a longitudinally reciprocating arm 31 that is powered to extend and retract according to the curved locus L that causes the stuffer tine 28 to enter into the pre-baling chamber 18.

Alternatively the stuffer tines 28 may be mounted in a similar manner to the packer tines 24 on a shaft extending between the two lateral rotor discs 29 and may be caused to extend and retract in a similar manner to the shaft-mounted packer tines 24.

The stuffer tines 28 occupy a retracted position, outside the pre-baling chamber 18, until the plunger 22 moves in a manner opening the entrance 23. At this time the stuffer tines 28 move into the pre-baling chamber 18 while operation of the packer tines 24 continues.

The stuffer tines 28 may be provided as a series of tines protruding parallel to one another at intervals along a shaft or other mounting that extends transversely inside the baling machine above the upper wall 27 of the pre-baling chamber 18. The upper wall 27 is as explained perforated by a transversely extending series of slot-like openings 26 that permit the stuffer tines 28 to enter and exit the pre-baling chamber 18 as described. The slot-like openings 26 for the stuffer tines 28 may be provided in alternation with and extending parallel to the slot-like openings 26 for the packer tines 24. The packer tines 24 do not fill the whole cross-section of the pre-baling chamber 18 since this would lead to jamming of the pre-baling mechanism if more than a small amount of plant matter P became packed in the upper section of the pre-baling chamber 18 with the entrance 23 closed. On the contrary the packer tines 24 must be capable of moving through the plant matter P in the pre-baling chamber 18 and they are designed accordingly.

Figure 6:
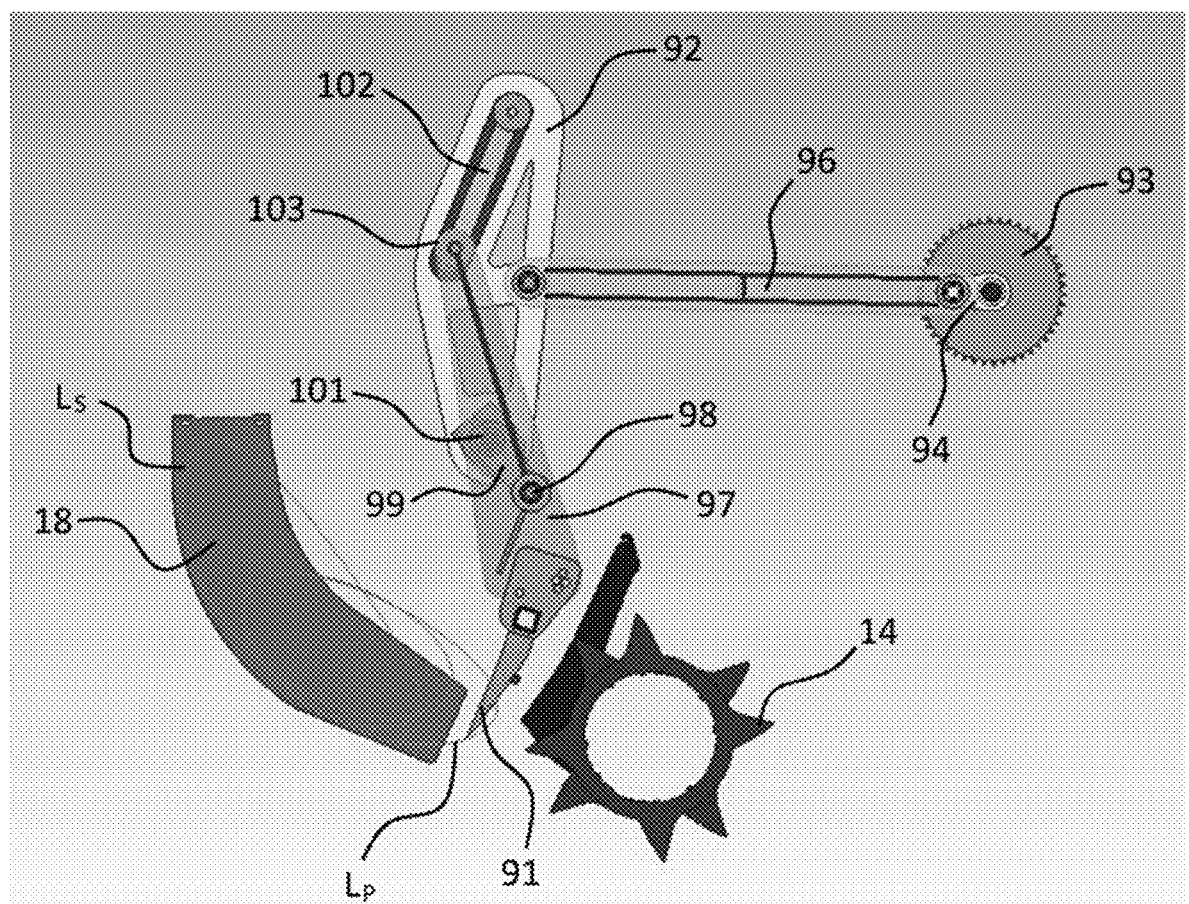
FIG. 6 is a simplified view of a double stroke packer/stuffer arrangement in which one or more dual-purpose tine is shown operating as a packer tine.
Figure 7:
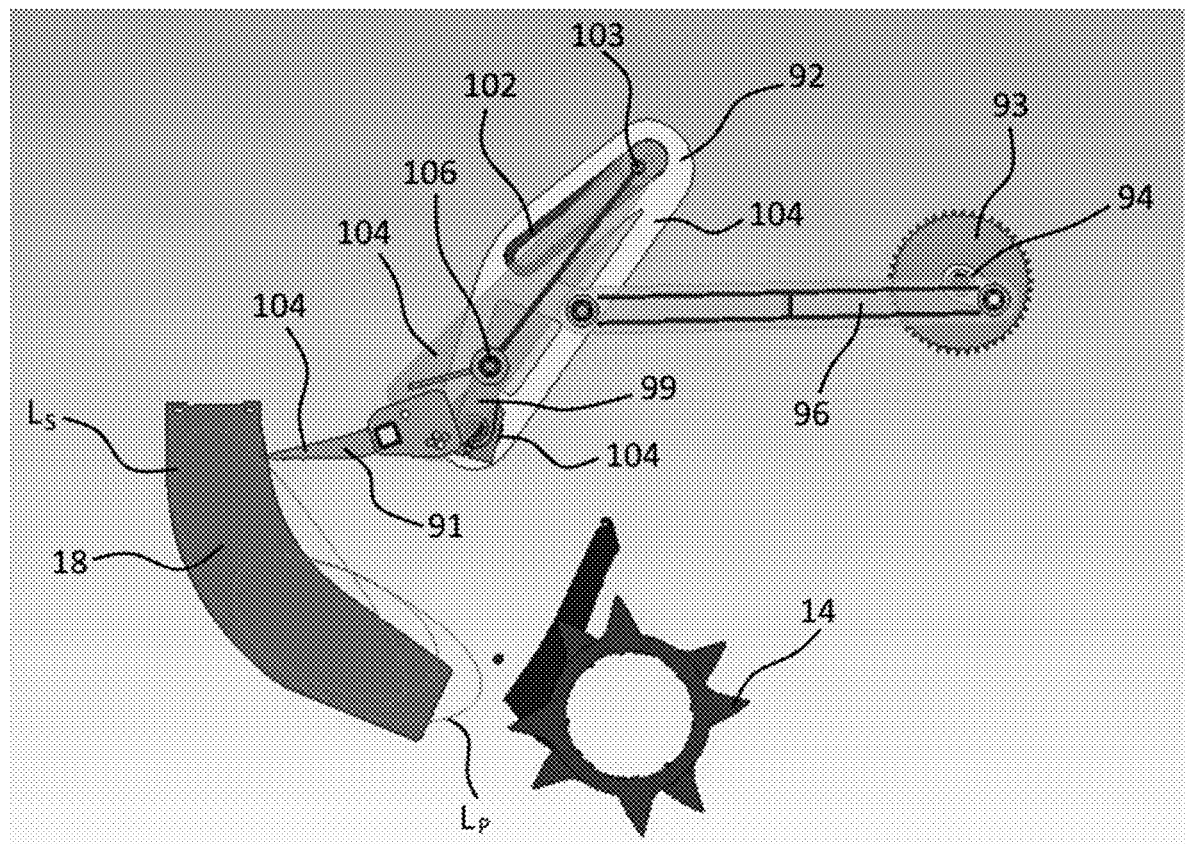
FIG. 7 is a similar view to FIG. 6 in which the packer/stuffer arrangement has adjusted so that the one or more dual-purpose tine operates as a stuffer tine.

Another type of packer/stuffer sub-system is referred to herein as a "double stroke" mechanism a non-limiting example of which is described in relation to FIGS. 6 and 7.

As is clear from the foregoing although the retractable and extendable nature of the various tines is illustrated with reference to a shaft, this need not necessarily be the case; and retraction/extension otherwise than relative to a shaft is possible within the disclosure hereof.

The invention is of benefit in all kinds of baling machine as aforesaid, including towed and self-powered types. The disclosure hereof of aspects of the invention includes their disclosure in combination with the various types of baling machine described in the foregoing or otherwise disclosed herein, but is not limited to such combinations.

There are several known ways of determining when sufficient plant matter P has been packed in the pre-baling chamber 18 to warrant stuffing into the bale-forming chamber 21. Probably the most common is a spring-loaded door that is formed in lower wall 32 of the pre-baling chamber.

The spring-loaded door is biased by a spring to remain closed, but as the quantity of plant matter P builds up in the pre-baling chamber 18 the force of it acting against the door counteracts the spring loading.

Eventually the quantity of plant matter is sufficient to open the spring-loaded door against the biasing of the spring. At this point the stuffing operation is initiated. This can be effected by e.g. a mechanical linkage that is connected to the spring-loaded door; or electrically e.g. through opening or closing of a switch when the spring-loaded door opens. Other ways of using the motion of a spring-loaded door also are possible.

The spring-loaded door suffers from numerous disadvantages. Among these is that overcoming of the biasing force of the spring does not necessarily imply that a sufficient quantity of plant matter P has been packed in the pre-baling chamber 18. Thus for example if the plant matter P has a high moisture content the spring-loaded door may open even if the amount of plant matter P is small. As a result the density of the bale formed in the bale-forming chamber 21 also may be unacceptably low or may be inconsistent.

Furthermore the use of a spring-loaded door does not readily permit a baling machine to transfer from e.g. a straw field to a forage field. The density of forage is almost always different from that of straw so if the spring-loaded door is used to determine when to initiate a stuffing operation it is necessary partially to dismantle it, and change the biasing spring, before the baling machine can successfully swap from baling one type of product to another. This requires the operator to exit the tractor employed to tow the baling machine 10, and is time-consuming.

Yet a further drawback of using a spring-loaded door as a stuffer trip mechanism is that stones in the pre-baling chamber 18 can become jammed or blocked in the door mechanism, thereby preventing correct operation.

It is known to use force sensors in a lower section of the pre-baling chamber, "downstream" of the disc 29, to determine initiation of the stuffer stroke as described above. However this approach does not give accurate results.

As noted under-filling of the pre-baling chamber resulting from force measurement inaccuracies is a problem; and a further problem is over-filling leading to plugging of the pre-baling chamber 18. This is a serious inconvenience when it occurs, and may result in damage to the baling machine. In any event it typically is a lengthy operation, involving partial dismantling of the baling machine, to clear plugging of the pre-baling chamber 18.

It is an aim of the invention to address or ameliorate one or more problems of prior art baling machines.

Although FIG. 1 is a representation of a per se known baling machine, the features and principles illustrated thereby are non-limiting examples of aspects of baling machines in which the features and principles of the invention may be employed. Thus the following description may be considered as disclosed optionally in combination with the FIG. 1 features.

Figure 2:
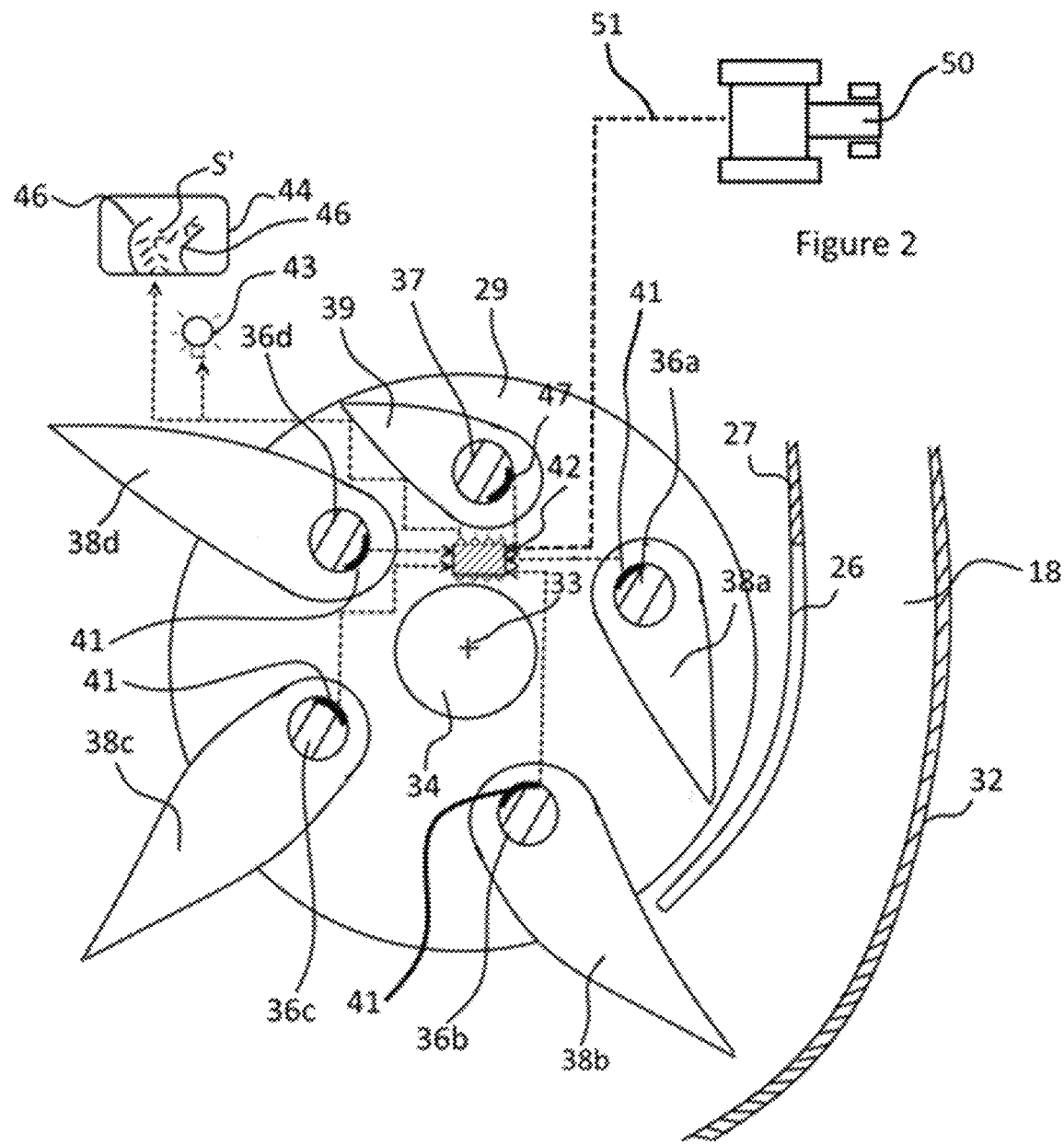
FIG. 2 is a schematic, side elevational view of a modified rotor arrangement, for supporting packer tines and a stuffer tine, in accordance with the invention.

FIG. 2 shows a packer and stuffer arrangement, in accordance with the disclosure, that may be used in replacement of the arrangement of the packer tines 24 and the arrangement of the stuffer tine 28 of FIG. 1.

FIG. 2 is a partially sectioned side elevational view of components including one of the openings 26 formed in the upper wall 27 of the pre-baling chamber 18 of a baling machine such as but not necessarily as shown in FIG. 1.

A circular, rigid rotor 29 is mounted for rotation about a central, horizontal rotor axis 33 that is coaxial with the longitudinal center of a bar-like rotor main shaft 34. Shaft 34 is mounted in journal bearings or similar mountings at its ends and is capable of rotation about the rotor axis 33. The shaft 34 passes through the rotor 29. The rotor 29 and the shaft 34 are keyed or otherwise secured to one another such that rotation of the shaft 34 causes rotation of the rotor 29.

The shaft 34 is coupled to a drive arrangement that causes powered rotation of the shaft 34. The shaft 34 may alternatively be embodied in other forms, e.g. as a drive part as would be familiar to the person of skill in the art.

Rotation of the shaft 34 in the illustrated embodiment may be selectively caused, e.g. in dependence on electrical command signals or mechanical triggering of one or more drive clutches so that rotation of the shaft 34, and hence the rotor 29, occurs when desired. It should be noted in this regard that the use of a shaft per se as explained above is exemplary only, and may be substituted by any of a range of alternative rotary parts as would occur to the person of skill in the art.

In use the rotor 29 rotates in an anticlockwise direction when viewed as shown in FIG. 2. In at least some embodiments the rotor also can rotate in a reverse direction e.g. for the purpose of clearing blockages or for other reasons.

Rotor 29 is located at one lateral end of shaft 34. A further, similar rotor (that is not visible in FIG. 2) is keyed or otherwise secured to the drive shaft 34 at the opposite lateral end of the shaft 34. A series of four (in the embodiment shown, although other numbers are possible within the scope of the invention) bar-like packer tine shafts 36a-36d and a stuffer tine shaft 37 are secured to the rotor 29 at equiangular spacings on a pitch circle defined between the drive shaft 34 and the outer circumference of the rotor 29.

The packer tine shafts 36a-36d and the stuffer tine shaft 37 extend from the rotor 29 parallel to the drive shaft 34 and are secured at their opposite ends to those visible in FIG. 2 to the further rotor referred to above. Thus the shafts 36a-36d and 37 define an open, approximately cylindrical framework extending between the two rotors. Such an arrangement represents one way of embodying the disclosure hereof; but other ways are possible. An alternative, non-limiting example is described herein that relies on meshing gears and omits shafts defining a cylindrical framework as in the FIG. 2 embodiment.

Further equivalents to such arrangements are possible within the scope of the invention, including but not limited to stuffer beams, cam tracks, gear trains and combinations of such mechanisms.

Each of the packer tine shafts 36a-36d includes mounted at intervals along its length a series of packer tines of which in each case one packer tine 38a-38d is visible in FIG. 2. The visible packer tines 38a-38d in FIG. 2 are those closest to the rotor 29. The overall arrangement is of a series of packer tines supported at intervals (a) about a circumference defined by the rotor; and (b) at intervals along the packer tine shafts 36a-36d.

In the presently preferred embodiment of the invention as illustrated each of the packer tines has a profile resembling that of a fork tine. Other profiles and designs of the packer tines are possible within the scope of the invention. The packer tines preferably are made from a hard, resilient, wear-resistant material such as but not limited to a steel alloy. A great number of metallic and non-metallic materials (including composite or sintered materials) is suitable for the manufacture of the packer tines.

In some embodiments the packer tines may include wear-resistant facings or coatings that may be affixed in any of a variety of ways as would occur to the person of skill in the art.

The packer tines 38a-38d in embodiments are likely all to be of the same design and dimensions although conceivably this may not be the case. Some variation among the designs of the packer tines 36a-36d is schematically shown in FIG. 2.

The spacings of the packer tines along the respective shafts 36a-36d may vary from one baling machine to another, and in some embodiments may be adjustable, depending on the relevant performance and design requirements. As explained above however it is typically the case that a series of packer tines extending from one end of a packer tine shaft to the other does not occupy the whole width of the pre-baling chamber 18 since this could lead to jamming of plant matter in the chamber 18. Instead the packer tines are spaced apart along each shaft 36a-36d so that the packer tines when extended (as explained below) perform their intended function of packing plant matter towards the upper end of the pre-baling chamber 18 without a risk of plugging under normal circumstances. In a preferred embodiment the packer tines are transversely spaced from one another by equal distances along the supporting shafts 36. However this need not necessarily be the case.

The existence of the packer tines 38 as a transversely spaced series extending along each of the shafts 36a to 36d means the upper wall 27 of the pre-baling chamber 18 may be perforated by a corresponding series of elongate apertures 26 that extend along part of the length of the pre-baling chamber 18. The dimensions of the apertures 26 are sufficient to let the packer tines 38 move into and out of the pre-baling chamber 18 as described below yet a sufficient area of upper wall 27 remains in order to prevent the loss of plant matter upwardly out of the pre-baling chamber 18.

Each packer tine 38 is capable of rotational movement relative to the rotors, so that the packer tines 38 can be moved between an extended position (exemplified by the position of packer tines 38b, 38c and 38d in FIG. 2) and a retracted position as exemplified by packer tine 38a. In the illustrated embodiment this effect is achieved by reason of the packer tines 38 being rigidly secured (e.g. by welding, gluing, bolting or similar techniques) to the packer tine shafts 36a-36d, and the packer tine shafts being rotatable relative to the rotors. However in alternative embodiments the packer tines 38 may be rotatable relative to the packer tine shafts 36a-36d. In such a case it may be desirable to fix the shafts 36a-36d to the rotors so that rotation of the shafts relative to the rotors does not occur. Combinations of rotational mounting types also are possible within the scope of the invention. Also the precise angular orientations of the tines may differ from those illustrated.

As a result of the rotational mounting of the packer tines 38 relative to the rotors the packer tines may be caused to rock between the extended and retracted positions. Such rocking may be effected by an activator in the form of e.g. a mechanical, hydraulic or electrical (motor-type) packer activation mechanism that causes the packer tines to occupy the extended position when rotation of the rotor causes rotation of the packer tines about the rotor axis to coincide with the openings 26, as illustrated; and retract for a further part of the rotation of the rotors commencing shortly before the packer tines coincide with the longitudinal ends of the openings 26. A further possibility is for the packer tines 38 to be spring-mounted in a manner permitting their relative extension and retraction.

The extent of the protrusion of the packer tines 38 may be arranged to be variable, in dependence on the quantity of plant matter P for the time being in the pre-baling chamber 18. As a result the loci of movement of the packer tines 38 may be variable. It will readily occur to the person of skill in the art how to embody this requirement in the various mechanism types outlined above.

When in the extended position the packer tines 38 protrude outwardly beyond the rotors with the result that they protrude into the pre-baling chamber 18 in the manner described with reference to FIG. 1. When retracted the packer tines 38 lie within the outer circumference defined by the rotors. As a result it is not necessary for there to be a space above the rotors for accommodating extended packer tines 38 during the further part of the rotor rotation.

A line of stuffer tines 39 is secured to the stuffer tine shaft 37 in a similar manner to the packer tines 38. The stuffer tines 39 also each have a cross-section resembling a fork tine and may or may not be of the same design as one or more of the stuffer tines 38a-38d. The stuffer tines 39 when extended to penetrate the pre-baling chamber 18 act as positive displacement members forcing the plant matter in the pre-baling chamber above the opening 26 into the bale-forming chamber 21 of the baling machine.

A stuffer activator, that may be similar to the packer activator or may differ therefrom, causes controlled extension and retraction of the stuffer tines 39 in a similar manner to the extension and retraction of the packer tines 38.

The length of the extended stuffer tines 39 in the radial direction causes the stuffer tines to penetrate the pre-baling chamber when the rotation of the rotors causes the stuffer tines 39 to coincide with the openings 26 or with other openings specifically intended to receive the stuffer tines 38 if for example they are positioned on the shaft 37 so that they are not in register with the packer tines. Timing of operation of the stuffer activator is as described above, with the result that extension of the stuffer tine 39 occurs when it is required to stuff a charge of plant matter into the bale-forming chamber 21. The motion of the stuffer tines 39 therefore is (or is similar to) the locus L of FIG. 1 during normal operation.

The foregoing description relates to tines that retract and extend through movement in directions perpendicular to the associated tine shaft. It is however possible to design retractable tines that retract to lie parallel to the shaft and extend according to a different type of extension path to that described. Further tine designs, that do not extend and retract relative to supporting rotary shafts are possible. Non-limiting examples of such designs are described herein.

At least one sensor 41 is provided in a manner sensing the torque acting via at least one of the packer tines 38 and/or a force acting on at least one packer tine 38 and/or the displacement of such a packer tine from a starting or other known position. In practice a plurality of the sensors 41 is likely to be provided. As explained, torques, forces and displacements are examples of the kind of vector or pseudovector quantity that usefully can be sensed or measured in embodiments of the invention. The invention however is not limited to the examples, and it is possible to sense or measure other useful quantities within the scope of the invention, as will occur to the person of skill in the art.

In FIG. 2 a respective sensor 41 is shown between each packer tine 38a-38d and the packer tine shaft 36a-36d on which it is mounted. In a typical (but non-limiting) embodiment such sensors would be provided on the surfaces of the shafts 36a-36d in question at each end of each packer tine shaft 36a-36d and in each such case adjacent one of the packer tines. Such sensors also may be provided for measuring forces or torques developed in packer tines 38 intermediate the ends of the packer tine shafts 36a-36d. As an alternative embodiment, it is possible to place more than one sensor on the length of the same shaft. This would not only provide an indication of the degree of filling (or compression) in the pre-baling chamber, but also would make possible an assessment of difference between the signals coming from the same shaft in order to provide a left/right steering indication.

Although multiple sensors 41 are for various reasons preferred, embodiments of the invention are possible in which only a single sensor 41 is provided.

Figure 3:
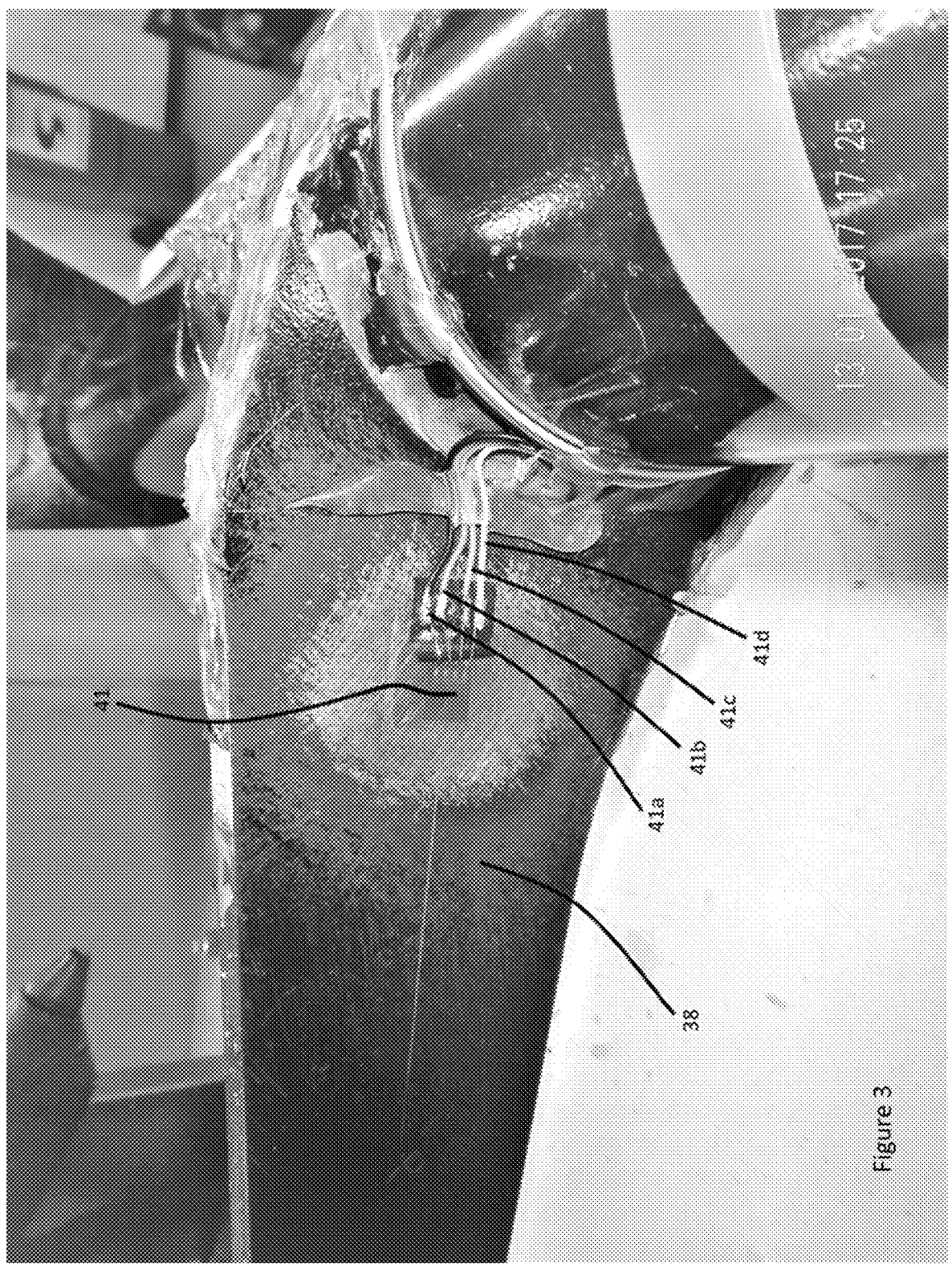
FIG. 3 is a perspective view of a sensor of one or more vector or pseudovector quantity secured to a tine of a baling machine.

The sensors 41 may be of any of a range of types, including but not limited to strain gauges or load cells. In FIG. 2 as explained the sensors are located between the packer tines 38 and the packer tine shafts 36a-36d on which they are mounted. However numerous other arrangements of the sensors 41, that permit the measuring of vector or pseudovector quantities developed at or near the packer tines, are possible within the scope of the invention. FIG. 3 shows an example of a sensor 41 in the form of a strain gauge that is secured using an adhesive compound to a flank of a packer tine 38.

As is well known a strain gauge may be connected in or include a bridge circuit for the purpose of generating electrical signals that are indicative of force exerted on the tine 38. FIG. 3 shows wiring 41a to 41d provided for this purpose although, as will be apparent to those of skill in the art, numerous other ways of embodying appropriate sensors 41 are possible and within the scope of the disclosure.

It is also possible to locate the sensors 41 differently, for example at the free ends of the packer tines 38. However the harshness of the environment experienced by the packer tines 38 suggests that locating the sensors on the shafts that mount the tines, or at the regions of the tines adjacent the shafts as illustrated in FIG. 3, is likely to be a more robust arrangement.

The or each sensor 41 or in some embodiments, such as that of FIG. 3, an associated bridge circuit or similar signal generator is connected to one or more processors represented schematically in FIG. 2 by numeral 42. The processor(s) 42 may be located on or in the baling machine 10; on or in a towing tractor 50 or other towing vehicle; or remotely of both the baling machine 10 and any towing vehicle. The processor(s) 42 may moreover be distributed between multiple locations that need not all be parts of a single vehicle. FIG. 2 shows in schematic form an optional connection 51 of the processor 42 to the towing vehicle 50. As will be known to the person of skill in the art such a connection may take a variety of forms, including wired and wireless embodiments. The image in FIG. 2 therefore is intended to be representative only, and is not limiting of the invention.

The processor(s) 42 are capable of determining the loading on at least one of the packer tines 38 caused by the build-up of plant matter in the pre-baling chamber 18 during packing operations effected by the packer tines 38. When this loading exceeds a threshold corresponding to desired filling of the pre-baling chamber 18 the processor(s) 42 may generate one or more commands that cause interruption of the packing sequence, retraction of the packer tines 38 as described above and extension of the stuffer tine 39 to effect stuffing of a charge of plant matter into the bale-forming chamber 21.

To this end the processor(s) 42 are directly or indirectly connected to control or at least activate the packer activator and the stuffer activator described herein. Such connection of the processor(s) 42 is not illustrated in FIG. 2 but may readily be envisaged by one of skill in the art. The processor(s) 42 generate appropriate outputs such as command signals for transmission to the packer and stuffer activation mechanisms. As mentioned preferably such signals are electrical signals but they may take other forms if desired.

The described control regime is advantageous because it is not highly dependent on the mass of the plant matter in the pre-baling chamber and therefore is largely independent of e.g. the moisture content of the plant matter.

The processor(s) is/are capable of generating further outputs for display, guidance and/or warning purposes. As one example FIG. 2 shows a warning lamp 43 that may be commanded by the processor(s) 42 to illuminate in the driver's cab of a towing tractor, in order to advise the driver of a transition from packing to stuffing processing in the pre-baling chamber 18.

The baling machine further may optionally be configured, when plural sensors 41 are provided at spaced locations on at least one packer shaft 36, to sense the torque or another vector or pseudovector quantity, or a mix of such quantities, respectively at left- and right-hand parts of the transverse cross-section of the pre-baling chamber 18. In such a case the outputs of the sensors 41 may be processed by the processor(s) 42 to provide an indication of the evenness of filling of the pre-baling chamber 18.

This parameter of pre-baling chamber filling is often a function of the alignment of the pick-up 14 relative to the swath S. It is possible within the scope of the disclosure for the processor(s) 42 to use the aforesaid indication of the evenness of filling of the pre-baling chamber 18 to influence the direction of the baling machine 10 in a manner that optimises the alignment of the pick-up 14 relative to the swath S and thereby eliminate uneven filling of the pre-baling chamber.

One way of achieving this effect is illustrated in FIG. 2, in which an output of the processor(s) 42 in the form of one or more directional guidance signal is fed to a screen 44 in the tractor cab showing an image S' of the swath S in front of the tractor-baling machine combination generated by e.g. a forwardly facing camera mounted on the tractor. Steering guidance lines 46 may be synthesized from the sensor signals processed by the processor(s) 42 and transmitted as part of the directional guidance signal. The steering guidance lines may be overlain on the swath image S' as shown schematically in FIG. 2. The steering guidance lines then may be used by the driver of the tractor to steer in order to optimize the alignment of the pick-up 14 of the towed baling machine 10 relative to the swath S.

In a simpler arrangement instead of guidance lines 46 the display 44 could simply display e.g. left- or right-pointing arrows indicating to the driver the direction in which to turn in order to optimize filling of the baler. Such an arrow could remain displayed until the processor 42 determines (using the outputs of the sensors 41) that even filling is occurring.

An even simpler version of the invention may achieve a similar effect through the illumination of lamps and/or the sounding or alerts respectively on the left hand and right hand side of the tractor dashboard. Partly in view of this embodiment it is clear that a display screen 44 is an optional feature of the embodiments disclosed hereby. Instead of warning lamps other sensory alerting devices (including but not limited to audible and/or vibratory alarms) may be employed.

In an alternative embodiment the tractor may be equipped with an automated steering mechanism that adjusts the steering of the tractor without a need for driver input. In such a case steering guidance control commands for the automated steering mechanism may be generated by the processor(s) based on the sensor outputs. In such an embodiment it may not be strictly necessary to display synthesized steering guidance lines, although these optionally may be provided nonetheless in order to provide feedback to the tractor operator. When an automated steering mechanism of this kind is provided it is preferred to provide for vector or pseudovector sensing at all the tines in a or each transverse row.

Figure 8:
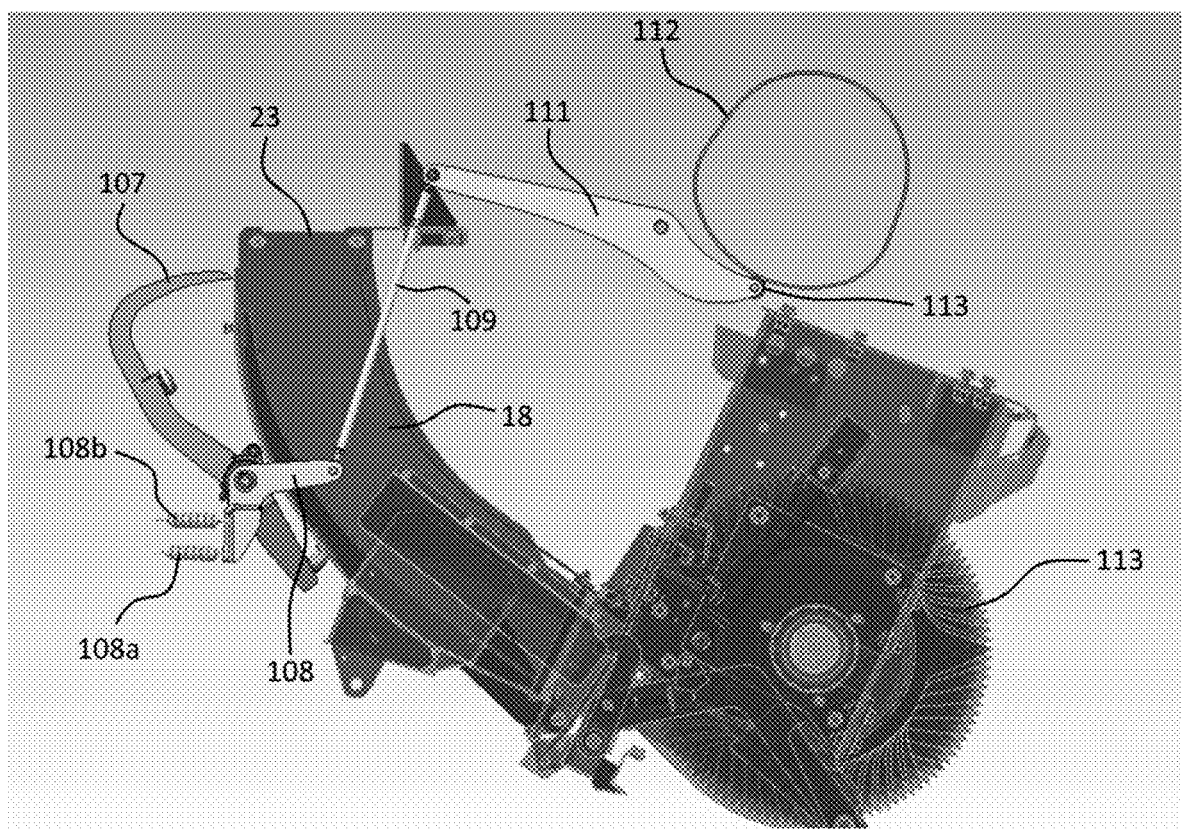
FIG. 8 shows another pre-baling chamber including one or more straw hooks that may be employed, in embodiments, to prevent clogging of straw in the upper end of the chamber.

A further option is for the processor(s) 42 to generate speed commands or speed guidance signals for influencing or controlling the forward speed of the tractor. Such an arrangement is likely to be of greatest benefit, in optimizing filling of the pre-bailing chamber, when the towing tractor includes an automated speed control system. This benefit arises because a better timing of the position of the rotating stuffer tine can be achieved. Ideally, the stuffer tine should be at the lower end of the pre-baling chamber when sufficient amount of crop material at the correct density level is in the pre-baling chamber, and when the plunger is about to retract in the baling chamber, so as to open up the entrance 23 (together with the removal of packer tines or any hooks, an example of which is shown in FIG. 8, from the pre-baling chamber).

Such features may in embodiments be provided in combination with one or more sensor, camera or other device (that may be mounted on the baling machine 10 and/or on a towing tractor 50) for detecting the line/position, shape (e.g. transverse cross-sectional shape), volume and/or density of the swath(s) S intended to be baled, and generating signals indicative thereof. Such signals may be processed in combination with the outputs of the sensors shown in the drawings, e.g. in the one or more processor 42 or 72 or in other processing capability that is operatively connected to the baling machine 10.

When the sensors on the packer tines are able continuously to measure the increase in torque as the crop material is entering the pre-baling chamber, it will be possible for a controller such as processor 42 to estimate how much time is needed to reach the required density level in the pre-baling chamber.

In combination with a location sensor such as but not limited to an encoder the position of the stuffer tine is known, and then the forward speed of the tractor can be adjusted (so slowing down would cause less crop material to enter the pre-baling chamber 18 and increasing the speed would cause more crop material to enter the pre-baling chamber) such that, when the stuffer tine reaches the entrance of the pre-baling chamber 18, the correct density exists in the pre-baling chamber. As a result, driving faster or slower will result in an optimal position of the stuffer tine when the threshold value of the density of the material is reached.

Steering guidance, steering command or speed command arrangements such as the foregoing also may be implemented, as necessary including any desirable modifications, in self-powered baling machines.

At least one further sensor 47 may be mounted similarly to the sensor(s) 41 to provide signals indicating the torque or another vector or pseudovector quantity developed in the stuffer tine 39. Measuring such a vector or pseudovector quantity in the stuffer tine 39 allows for the timing of the stuffer tine 39 and the plunger 22 to be monitored. If the measured quantity exceeds a predetermined threshold it would indicate unexpected resistance to the stuffing operation. This resistance could be a result of the plunger 22 not moving at the right time, or not moving far enough, such that it blocks at least part of the entrance 23 to the bale-forming chamber 21. The sensor(s) 47 therefore allow for early detection and remedying of such problems.

Such a sensor 47 could be provided in combination with the packer shaft-mounted sensors 41, or could be present even if the sensors 41 are not present.

Although the stuffer tine 39 in FIG. 2 is shown mounted on a stuffer tine shaft 37 extending between the rotors 29 such that the stuffer tine is rotatable with the rotors (and also rotatable relative to the rotors 29 as explained), in an alternative embodiment the stuffer tine could be mounted, as shown in FIG. 1, by way of a stuffer tine reciprocal linkage that includes at least one longitudinally reciprocal arm or linkage member such as member 31 movement of which causes the stuffer tine reciprocally to extend into and retract from the interior of the pre-baling chamber 18. In such a case it is anticipated that the stuffer tine shaft 37 would be replaced by an additional packer tine shaft 36 giving rise to a series of five packer tines, each supporting one or more packer tines 38, at equiangularly spaced intervals about the pitch circle defined on the rotor. Any viable number of packer tine shafts may however be provided, as would occur to the person of skill in the art.

Figure 4:
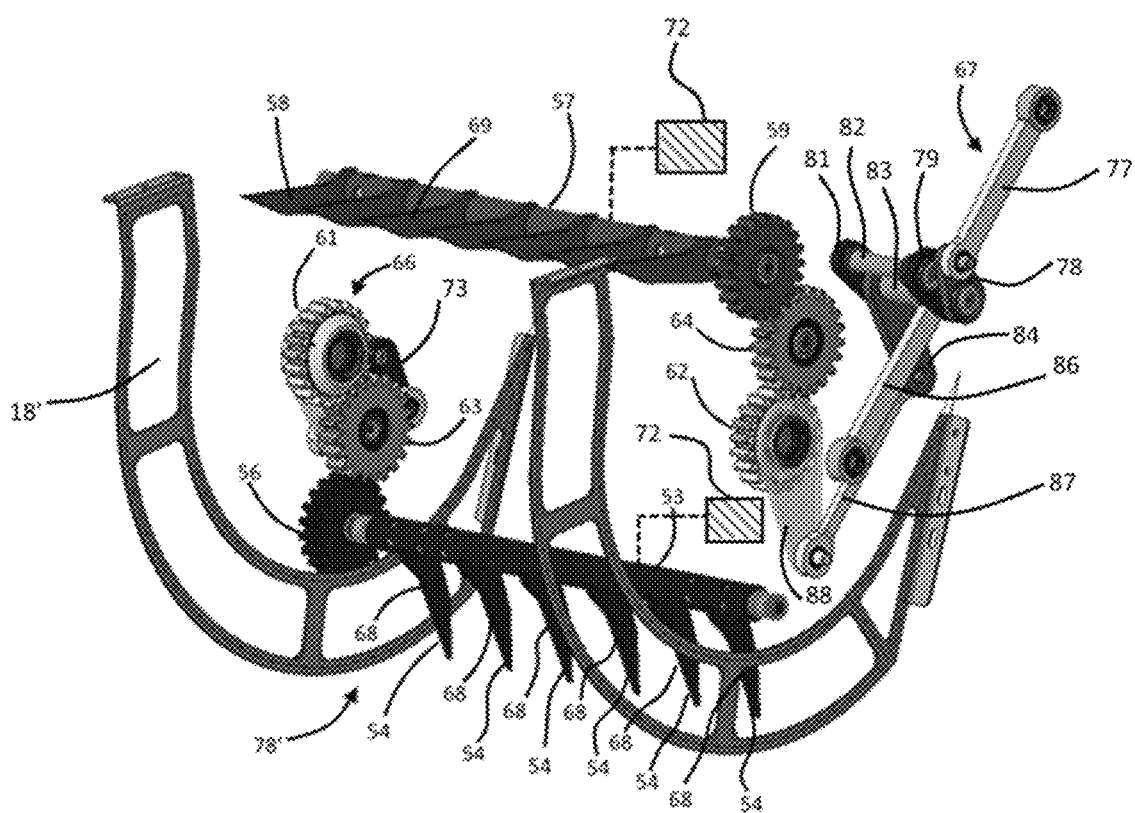
FIG. 4 is a perspective view of an alternative packer/stuffer configuration, in accordance with the invention.
Figure 5:
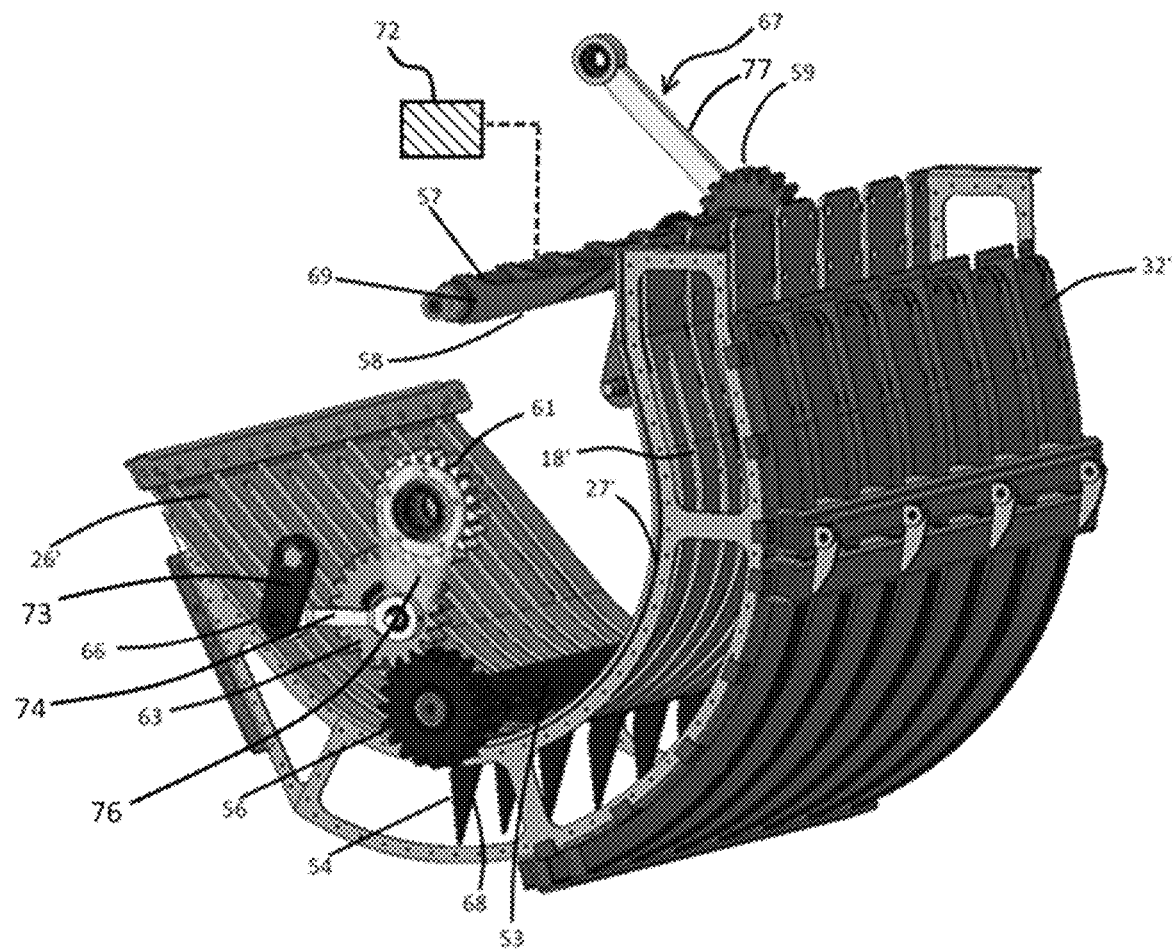
FIG. 5 is a different perspective view of the packer-stuffer configuration of FIG. 4.

For clarity FIGS. 1 to 3 hereof omit details of the packer tine activator and the stuffer tine activator; but these readily may be envisaged by a person of skill in the art. FIGS. 4 and 5 show another packer-stuffer assembly and pre-baling chamber in which packer and stuffer activator parts are visible. FIGS. 6 and 7 show a further embodiment in which packer and stuffer activator parts are also visible.

In FIGS. 4 and 5 a curved pre-baling chamber 18' is similar to pre-baling chamber 18 of FIGS. 1 and 2. Pre-baling chamber 18' includes as illustrated an upper wall 27' and lower wall 32' (FIG. 5). The functions and arrangement of the parts of the pre-baling chamber are similar or identical to counterpart features of the pre-baling chamber 18 of FIG. 1.

The upper wall 27' is perforated by an array of (in the embodiment shown, although in other embodiments they may vary) mutually parallel, longitudinally extending slots 26' via which packer and stuffer tines 54, 58 can extend into and retract out of the pre-baling chamber 18'. The slots 26' are spaced apart equally in the transverse direction of the upper wall 27' such that they align with the tines. In other embodiments the tines 54, 58 and the slots 26' need not be spaced apart equally.

In FIGS. 4 and 5 the packer/stuffer assembly comprises a packer shaft 53, packer tines 54, a packer gear 56, a packer pivot gear 61, a packer intermediate gear 63, a stuffer shaft 57, stuffer tines 58, a stuffer gear 59, a stuffer pivot gear 62, a stuffer intermediate gear 64, a packer connecting mechanism 66, a stuffer connecting mechanism 67, packer sensors 68, stuffer sensors 69 and one or more processors 72.

The gears are variously meshed together or otherwise connected in a drive-transferring manner, as described below.

The packer shaft 53 is a rigid cylinder that is mounted for rotation about its elongate central axis. A series of packer tines 54 is rigidly fixed to the outer surface of the rotatable packer shaft 53. The packer tines 54 are spaced apart equally along the packer shaft 53 length in register with the slots 26' and all extend in the same direction as illustrated. Rotation of the shaft 53 causes movement of the packer tines 54 through the slots 26' at one end thereof, into and along the pre-baling chamber 18' and subsequently out of the slots 26' near the opposite end to that of entry. The rotatable nature of the shaft 53 means that such motion may be caused to occur reciprocally.

In other embodiments the packer tines 54 may be rotatably secured to the packer shaft 53 giving rise to a similar but differently caused motion of the packer tines 54.

The packer gear 56 is a rigid disc including a central hole and is mounted on the packer shaft 53. Numerous fixing means are possible within the scope of the disclosure. In FIGS. 4 and 5 the packer gear is secured at one end of the shaft 53 but this need not be the case in all embodiments, and other locations are possible.

Moreover the shaft 53, and shaft 57 described below, may vary in numerous ways within the scope of the disclosure. As a non-limiting example, the shaft 53 and 57 need not extend continuously from one side of Chamber 18' to the other.

As mentioned the packer/stuffer assembly includes a packer pivot gear 61 and a packer intermediate gear 63 positioned between the packer gear 56 and the packer pivot gear 61. The various gears 56, 61 and 63 define a packer gear train and are toothed and meshingly engaged in a manner transferring rotative drive from e.g. a drive shaft (that is omitted from FIGS. 4 and 5) to cause rotation of the packer shaft 53 when required.

The baling machine 10 also includes a stuffer arrangement comprising a stuffer shaft 57, stuffer tines 58 and a stuffer gear 59. The illustrated embodiment also includes a stuffer pivot gear 62 and a stuffer intermediate gear 64 positioned between the stuffer gear 59 and the stuffer pivot gear 62. The gears 59, 62 and 64 in the resulting stuffer gear train are meshingly engaged in a rotation-transferring manner, in a similar way to the packer gear train gears 56, 61 and 63.

Parameters of the gears such as the gear type, tooth profile and gear ratio are not limited and may vary depending on the embodiment. Also, some embodiments may omit the packer and/or stuffer intermediate gears 63, 64 altogether to allow the packer and/or stuffer gears 56, 59 to engage with the packer and/or stuffer pivot gears 61, 62 directly. Instead of mutually engaged teeth other ways of causing rotational transfer are possible as will be known to the person of skill in the art.

The packer connecting mechanism 66 is a multi-bar linkage including first, second and third packer linkage members 73, 74, 76. One end of the first packer linkage member 73 is connected to a source of rotational kinetic energy and the other end is rotatably secured to one end of the second packer linkage member 74. The other end of the second packer linkage member 74 is rotatably secured to one end of the third packer linkage member 76. The other end of the third packer linkage member is fixed to the packer pivot gear 61.

The choice of rotational energy source is not particularly limited and various ways of achieving rotational movement will be known to the person of skill in the art. The packer connecting mechanism 66 enables the packer intermediate gear 63 to rotate about its transverse axis, thereby causing the packer pivot gear 61, packer gear 56 and packer tines 54 to rotate about the longitudinal axis of packer shaft 53. As the packer tines 54 rotate they shift plant matter toward the entrance of a bale-forming chamber such as chamber 21 of FIG. 1.

The desired motion of the packer tines may be achieved by securing the packer shaft 53 at or near each end to a respective rotor that in broad terms may be similar to the rotor discs 29 described in relation to FIG. 2. Such rotors are omitted from FIGS. 4 and 5 for ease of viewing but in complete embodiments would be powered to rotate. As a result the shaft 53 would in use describe a circular locus and the timed rotation of the shaft 53 about its own axis as described combines with such a locus such that the packer tines move as explained.

The packer/stuffer arrangement also includes a stuffer connecting mechanism 67 comprising first to tenth stuffer linkage members 77, 78, 79, 81, 82, 83, 84, 86, 87, 88 that are connected to each other in a manner that enables rotation of the stuffer tines 58 about the stuffer shaft axis. The stuffer connecting mechanism 67 additionally is further configured to initiate a stuffing operation to cause the entire stuffer arrangement (i.e. the stuffer gear train, stuffer shaft 57 and stuffer tines 58) to move according to a locus that is similar to the locus L in FIG. 1. Various methods and techniques may be used to enable this stuffing movement and these techniques will be known to the person of skill in the art.

In particular in the embodiment of FIGS. 4 and 5 the arrangement of linkage members 77 to 88 causes transversely extending shaft 57 supporting a row of the stuffer tines 58 to move, when powered, according to the desired locus; and the meshing train of gears 59, 64, 62 when powered causes the stuffer shaft 57 to rotate about its own longitudinal axis. The combined effect of these mechanisms is to cause the stuffer tines when required to generate a desired stuffer tine locus that is initiated as described below.

As a result, sequentially during the stuffing operation the rotating stuffer tines 58 move toward the pre-baling chamber 18' according to the desired locus; the entrance to the baling chamber opens; the rotating stuffer tines 58 enter and exit the pre-baling chamber 18' via the slots 26' while shifting plant matter P from the pre-baling chamber 18' into the bale-forming chamber 21; the rotating stuffer tines 58 move away from the pre-baling chamber 18'; and the entrance to the bale-forming chamber 21 closes.

Opening and closing of the entrance to the bale-forming chamber may result from operation of one or more straw hooks 107 as illustrated in FIG. 8.

As is visible in FIG. 8 the straw hooks, that in a similar manner to the various tines may be arranged as a spaced series extending transversely across the width of the pre-baling chamber 18, each adopt a scythe-like profile at their upper ends. A pivoting mounting at the lower end of straw hook 107 permits a curved part of the straw hook to enter and retract out of the upper part of the pre-baling chamber 18 adjacent the entrance to the bale-forming chamber.

The lower end of each straw hook is secured to a rocker member 108 that is biased by springs 108a, 108b to tend to cause the upper part of each straw hook 107 to lie within the pre-baling chamber 18, spanning it from one side to the other and preventing the feeding of plant matter from the pre-baling chamber into the bale-forming chamber.

A drive rod 109 is pivotingly secured at its lower end to a protruding arm of the rocker 108 extending on an opposite side of the rocker pivot to an arm of the rocker attaching the springs 108a, 108b and at its upper end to an end of a cam follower 111.

The opposite end of follower 111 follows a rotary cam 112 by reason of pivoting a mounting of the follower 111 between its ends. Optionally the follower 111 may include a follower wheel 113 that minimizes friction between the follower 111 and the rotary cam 112.

The cam 112 may be driven to rotate in dependence on the need to stuff a slice of plant matter into the bale-forming chamber as determined by the outputs of the one or more sensors described herein. The shape of the cam 112 then causes the follower to pull the drive rod upwardly, with the result that the rocker rotates anti-clockwise against the bias provided by the springs 108a,108b thereby causing the straw hooks temporarily to withdraw from the pre-baling chamber 18 as illustrated. This permits the stuffer tines to stuff plant matter as desired. Further rotation of the cam 112 causes the straw hooks 107 to re-enter the pre-baling chamber 18 and prevent the feeding of plant matter into the bale forming chamber.

The illustrated or a similar straw hook arrangement, which as shown preferably mounts the straw hooks 107 on the opposite side of the pre-baling chamber 18 to the tines, prevents the packer tines from packing plant matter against the piston and thereby assures that the bale forming chamber entrance does not become clogged with plant matter. Such a straw hook arrangement optionally may be included in any of the embodiments described herein.

The timing of activation of the stuffing operation is determined by a plurality of packer sensors 68 that are connected (for example but not necessarily using wiring) to one or more processors 72. In the embodiment of FIGS. 4 and 5, there is a packer sensor 68 mounted on each packer tine 54. As mentioned, the type and arrangement of the packer sensors 68 are not limited. The sensors 68 may for example be a set of strain gauges that are positioned at the base of each packer tine 54. Similarly, the type and position of the one or more processors 72 are not limited. Moreover, the number of packer sensors 68 and processors 72 may be different in other embodiments than that illustrated; and it is not necessary for the sensors all to be of the same or similar designs or types. On the contrary, considerable variance of the sensor arrangement is possible. One option is to mount one or more sensors on a member such as the link members 74, 87.

Each packer sensor 68 measures the torque or another vector or pseudovector quantity generated by the corresponding packer tine 54 and each packer sensor 68 then sends a signal (such as an electrical or optical signal) indicating the quantity value (that may be e.g. a torque value) to the one or more processors 72. In the arrangement of FIGS. 4 and 5 the torque is measured at each packer tine 54.

The processor(s) 72 (a) estimate from the torque (or another vector or pseudovector quantity if this is measured instead) the amount of plant matter in the pre-baling chamber (or a related variable) and (b) compare the estimated amount of plant matter (or related variable) against a threshold. The threshold may be pre-programmed or e.g. may be calculated in dependence on prevailing inputs to the one or more processors 72. Alternatively the threshold may be determined by firmware or may derive from physical parameters of the sensors 68 or other parts of the baling machine. The threshold may be configured to be the same for each packer tine 54 or may be different for one or more of the packer tines 54. In the latter case variations in plant matter density in the transverse direction of the pre-baling chamber 18' may be taken into account when determining e.g. whether to activate stuffing operations.

If the processor(s) 72 identify that the estimated amount of plant matter (or related variable) attains or exceeds the threshold, they activate the stuffer connecting mechanism 67 to initiate the stuffing operation described above.

The described arrangement allows for precise and consistent timing of the stuffing operation, based on the torque applied by the packer tines 54. The torque, in turn, is a parameter that relates to the amount of plant matter in the pre-baling chamber 18'. Therefore the stuffing operation is only initiated when the plant matter is sufficient to produce a charge of the desired quality. Prompt initiation of the stuffer cycle after the torque threshold is reached may provide the additional advantage of preventing damage to the rotative components of the mechanism.

As indicated above such features of the invention can furthermore be used to adjust one or more variable of the baling machine 10 such as but not limited to the forward speed of the towing tractor (or of the baling machine 10 if it is self-powered); the direction of travel of the baling machine 10; the rotational speed of the pick-up 14; the rotational speed of the rotor 29 (if provided); and the insertion of crop dividers.

At a simpler level of control the outputs of the sensor(s) 68, 69 may be used to generate a warning of impending over-filling of the pre-baling chamber. The programming of a processor 72 in order to achieve this effect is within the ability of the person of skill in the art and does not require describing in detail. Such use of the invention offers greatly improved warning accuracy and threshold setting ability than in prior art over-filling prevention arrangements, which rely on spring-loaded mechanical sensor-gates.

FIGS. 4 and 5 similarly include a plurality of stuffer sensors 69 used to measure the torque applied by the stuffer tines 58, and that are electrically connected to one or more processors 72. The processor(s) 72 compare the stuffer sensor 68 signals against a threshold that may be pre-programmed, may exist in firmware or may be a consequence of parameters of the components, in a similar manner to the packer tine threshold.

The stuffer sensor/processor arrangement operates in a similar manner to the packer sensor/processor arrangement described above. However, instead of being used for timing of the stuffing operation, the stuffer sensor/processor arrangement primarily is of use when interpreted as a blockage/component failure detection system.

If the processor(s) 72 identify that one or more of the stuffer sensors 69 has measured a torque that exceeds the pre-programmed threshold, it could mean that there is a blockage (or some fault) preventing the entrance of the baling chamber from opening. Consequently to avoid damage to the stuffer components the processor(s) 72 may be configured to effect a shut-down operation of at least part of, or in some embodiments the entirety of, the baling machine 10 when any of the stuffer sensors 69 indicates a torque (or other vector or pseudovector quantity if this is measured) beyond the threshold. In a simpler embodiment, the processor(s) 72 may cause e.g. an alarm or other alert to notify the tractor operator of a fault/blockage.

If as described in relation to FIG. 8 one or more straw hook 107 is provided to be insertable into the upper part of the pre-baling chamber 18 the indication of an excessive stuffer tine loading, as signified by the outputs of the sensor(s) 69, may influence the operation of a straw hook withdrawal mechanism that is described below. In particular withdrawal of the straw hook(s) 107 to permit the stuffing of plant matter into the bale-forming chamber 21 via the entrance 23 may be inhibited if one or more output of the stuffer tine sensor(s) 69 exceeds the threshold thereby indicating a blockage.

In one possible embodiment the processor(s) 72 may activate the shut-down operation or alarm only when multiple, or all, stuffer sensors 69 read torques greater than the threshold.

It is believed to be possible, and within the scope of the disclosure hereof, to use the outputs of the stuffer sensor(s) 69 when present to initiate the stuffer stroke, but it is preferred to make use of the outputs of the packer tine sensors 69 for this purpose. The invention is not limited to packer sensors 68 and stuffer sensors 69 that measure torque. In other embodiments, the sensors may be chosen to measure other useful vector or pseudovector quantities. Inputs to the processor(s) 72 that represent combinations of different quantities measured by the sensors are possible within the scope of the disclosure.

The processor(s) 72 can generate further outputs for display, guidance and/or warning purposes, similarly to the embodiment of FIG. 2 described above.

Another embodiment of rotative packer/stuffer sub-system is illustrated in FIGS. 6 and 7, and is of a type sometimes referred to as a "double stroke" mechanism. In such a mechanism a single transversely extending row of tines 91 is rendered dual-purpose by reason of from time to time following respectively a packing locus LP in the pre-baling chamber 18 and a stuffing locus LS as explained below. As is explained above the loci when followed cause the tines 91 to move in and along part of the pre-baling chamber 18.

The dual purpose nature of the row of tines 91 is achieved by reason of the tines 91 being supported in a four-bar chain one element of which is a rocker shaft 92 that rocks back and forth under the influence of a powered gear 93 crank 94 and conrod 96 combination in order to transition the locus followed by the tines 91 between the packing and stuffing loci LP, LS.

The dual-purpose tines 91 are rigidly secured so as to protrude as illustrated from the lower end of an approximately triangular, moveable tine plate 97, or in some arrangements a transversely extending series of such tine plates 97 providing multiple mounting points for the transversely extending series of dual-purpose tines 91.

The tine plate is pivotingly secured, approximately ⅓ of the way along its length, by way of a pivot joint 98 to one end of a crank arm 99 the other end of which is pivotingly secured, by way of a further pivot joint 101, to the lower end of the rocker shaft 92.

The end of crank arm 99 secured at pivot joint 101 is coupled to a drive mechanism, that is not visible in FIGS. 6 and 7, that causes crank arm 99 to rotate about pivot joint 101 in (in the illustrated embodiment) a clockwise direction.

The upper end of tine plate 97 is retained pivotingly, slidingly captive relative to a slot 102 by a sliding rotation joint 103.

When the packer/stuffer system of FIGS. 6 and 7 is in use to pack plant matter in the pre-baling chamber 18 the rocker arm 92 is stationary and the crank arm 99 is driven to rotate. This causes the dual-purpose tines 91 to follow elliptical locus LP with the joint 103 reciprocably sliding up and down in the slot 102. This repeatedly packs plant matter supplied from a pick-up 14 in the pre-baling chamber.

When it is required to stuff a slice of packed plant matter into the bale-forming chamber of the baling machine in which the packer/stuffer sub-system is installed, the gear 93 is powered to rotate. This may be achieved through activation of a drive mechanism that is not shown in FIGS. 6 and 7 and that causes the crank arm 94 to rotate in (in the embodiment shown) a clockwise direction.

This causes the rocker arm 92 to rock to the right as may be seen by comparing FIGS. 6 and 7. During this motion the crank 99 continues to rotate in the same direction as previously and the sliding rotation joint 103 moves upwardly and downwardly in the slot 102.

This combination of movements causes the tines 91 to follow the stuffing locus LS while the gear 93 is rotating. If rotation of the gear 93 is halted with the rocker arm 92 in the position shown in FIG. 6 the tines 91 then follow the packer locus LP. This may be achieved by for example employing a dog clutch to drive gear 93 so that it completes a single, complete revolution when it is required to effect a stuffing operation.

The dual stroke mechanism of FIGS. 6 and 7 may in accordance with the invention include one or more vector or pseudovector quantity sensors such as but not limited to:
- one or more load cells or strain gauges 104 secured so as to measure e.g. the force acting on one or more of the tines 91, the tine plate 97, the crank arm 99 or the rocker shaft 92 while the tines 91 follow the packing locus LP; and/or
- one or more torque sensors 106 sensing the torque acting on a drive shaft for the crank arm 99.

Numerous variations on the described arrangement are possible and within the scope of the disclosure. As a result the disclosure as regards double stroke mechanisms is not limited to the embodiment of FIGS. 6 and 7 which is exemplary only.

As in the case in the other embodiments described herein the outputs of the one or more sensors 104, 106 may be fed e.g. using a wired connection or wirelessly to one or more processors 72. The one or more processors 72 may generate one or more commands for initiating and, depending on the type of drive employed, terminating a rotative cycle of the gear 93 that as explained causes the tines 91 to follow the stuffer locus LS. Generation of such commands may be based on the sensor output(s) e.g. attaining or exceeding a threshold value indicative of a desired amount of plant matter in the pre-baling chamber 18. This is similar to the control arrangements described above.

Also in like manner to the control arrangements described above if the value of one or more vector or pseudovector quantity detected by the sensors 104 and/or 106 exceeds a threshold this may be used to indicate a potential blockage and generate a warning or preventative command (such as a command inhibiting the retraction of a straw hook 107 from the pre-baling chamber 18) as described. A further option is for the outputs of the sensors 104 and/or 106 to be used to control one or more variables of operation of the baling machine 10, also as described herein.

Operation of embodiments described herein is explained in the foregoing. Overall the invention provides for significant improvements, and novel functionality, in the pre-baling stage of a baling machine.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A baling machine comprising:
   a pre-baling chamber;
   at least one retractable and extendable tine including at least one stuffer tine supported on at least a first support and configured for sequentially penetrating, moving in, and retracting from the pre-baling chamber in accordance with a stuffing locus;
   at least one stuffer activator configured for causing the at least one stuffer tine in sequence to extend into, move in, and retract from the pre-baling chamber;
   at least one extendable and retractable packer tine that is reciprocably supported relative to the first support such that the at least one packer tine is configured for sequentially penetrating, moving in, and retracting from the pre-baling chamber;
   at least one vector or pseudovector quantity sensor configured for sensing a vector quantity or a pseudovector quantity, respectively, acting on the at least one packer tine, and wherein the vector quantity or pseudovector quantity that is sensed by the at least one vector or pseudovector quantity sensor is sensed when either the at least one packer tine subsists inside the pre-baling chamber or the at least one stuffer tine extends into the pre-baling chamber; and
   at least one processor configured for:
      estimating, from the sensed vector quantity or pseudovector quantity, an amount of plant matter in the pre-baling chamber or a variable related thereto; and
      when the estimated amount of the plant matter or the related variable attains or exceeds a threshold corresponding to desired filling of the pre-baling chamber, causing (i) the at least one packer tine to retract from the pre-baling chamber, and (ii) the at least one stuffer activator to effect extension of the at least one stuffer tine into the pre-baling chamber.

2. The baling machine according to claim 1, wherein the at least one packer tine is reciprocally supported relative to at least one further reciprocable support that is rotatable about a rotor axis adjacent the pre-baling chamber to cause rotation of the at least one packer tine about the rotor axis such that the at least one packer tine is configured for penetrating, moving in, and retracting from the pre-baling chamber.

3. The baling machine according to claim 2, wherein:
   the first and further supports are elongate,
   the at least one stuffer tine is a plurality of stuffer tines that are equidistantly spaced apart along the first support, and
   the at least one packer tine is a plurality of packer tines that are equidistantly spaced apart along the further support.

4. The baling machine according to claim 1, wherein the at least one stuffer tine is configured for sequentially penetrating, moving in, and retracting from the pre-baling chamber in accordance with a packing locus that differs from the stuffing locus, wherein the baling machine further comprises at least one packer locus drive configured for moving the at least one stuffer tine in a manner following the packing locus when not following the stuffing locus.

5. The baling machine according to claim 1, further comprising a stuffer tine reciprocal linkage that is connected to the at least one stuffer tine and movement of which causes the at least one stuffer tine reciprocally to extend into, move in, and retract from an interior of the pre-baling chamber.

6. The baling machine according to claim 1, wherein the at least one packer tine is a plurality of the packer tines that are mounted at equiangular intervals over part or all of a circumference defined by at least one reciprocable support.

7. The baling machine according to claim 1, wherein the at least one vector or pseudovector quantity sensor includes or is connected to a bridge circuit.

8. The baling machine according to claim 1, wherein the vector quantity or a pseudovector quantity that is sensed by the at least one vector or pseudovector quantity sensor is sensed when the at least one packer tine subsists inside the pre-baling chamber.

9. The baling machine according to claim 1, wherein the vector quantity or a pseudovector quantity that is sensed by the at least one vector or pseudovector quantity sensor is sensed when the at least one stuffer tine extends into the pre-baling chamber.

10. The baling machine according to claim 9, wherein the at least one processor is further configured for:
comparing the vector or pseudovector quantity detected at the at least one stuffer tine to a limit threshold value; and
causing an alarm or interrupting operation of the at least one stuffer tine when the vector or pseudovector quantity attains or exceeds the limit threshold value.

11. The baling machine according to claim 1, wherein the at least one sensor comprises respective sensors sensing a vector or pseudovector quantity on left-hand and right-hand sides of the pre-baling chamber.

12. The baling machine according to claim 11, wherein the at least one processor is further configured for determining an optimal direction of motion or speed of the baling machine, based on outputs from the respective sensors, to optimize filling of the pre-baling chamber; and generating a directional or speed guidance signal indicative of an instantaneously prevailing optimal direction.

13. The baling machine according to claim 1, wherein the vector or pseudovector quantity sensed by the at least one vector or pseudovector quantity sensor includes one or more of:

a torque or a force acting via the at least one packer tine when the at least one packer tine extends into the pre-baling chamber, a displacement of the at least one packer tine when it so extends, a torque or a force acting on or via the at least one stuffer tine when the at least one stuffer tine extends into the pre-bailing chamber, a displacement of the at least one stuffer tine when it so extends; or a torque or a force acting in a shaft connected to a power-take-off of a vehicle to which the baling machine is connected; or a displacement of a shaft connected to the power-take-off of the vehicle to which the baling machine is connected.

14. An agricultural system comprising:
(i) the baling machine according to claim 1, wherein the at least one processor is further configured for:
determining an optimal direction of motion or speed of the baling machine, based on outputs from the respective sensors, to optimize filling of the pre-baling chamber; and
generating a directional or speed guidance signal indicative of an instantaneously prevailing optimal direction; and
(ii) a tractor towing the baler, the tractor comprising:
an automated steering mechanism;
a speed control mechanism; and
a display,
wherein the at least one processor is operatively connected to the tractor and is further configured for:
transmitting the directional or speed guidance signal for use in the tractor as one or more of:
a directional command for commanding operation of the automated steering mechanism to steer the tractor in a manner optimizing filling of the pre-baling chamber;
a speed setting command for commanding operation of the speed control mechanism in a manner optimizing filling of the pre-baling chamber; or
a warning signal for causing an alert on the display.

* * * * *